Jan. 10, 1928.
A. KAMERMAN
1,656,069
LIQUID LEVEL INDICATING DEVICE
Filed Nov. 27, 1925
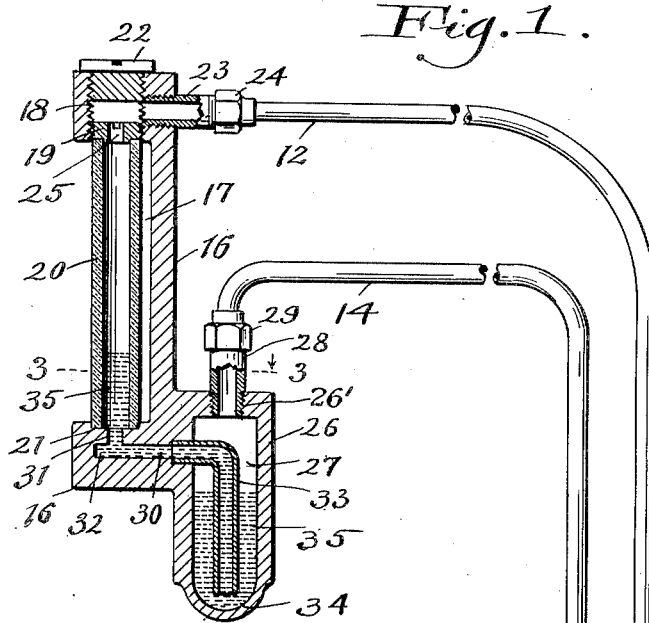
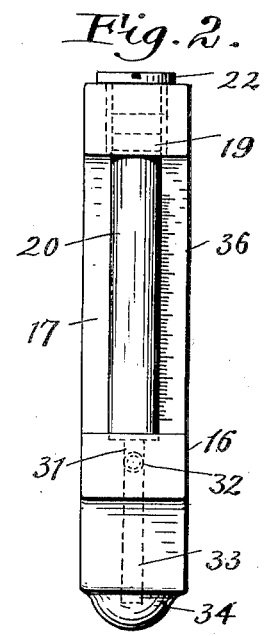
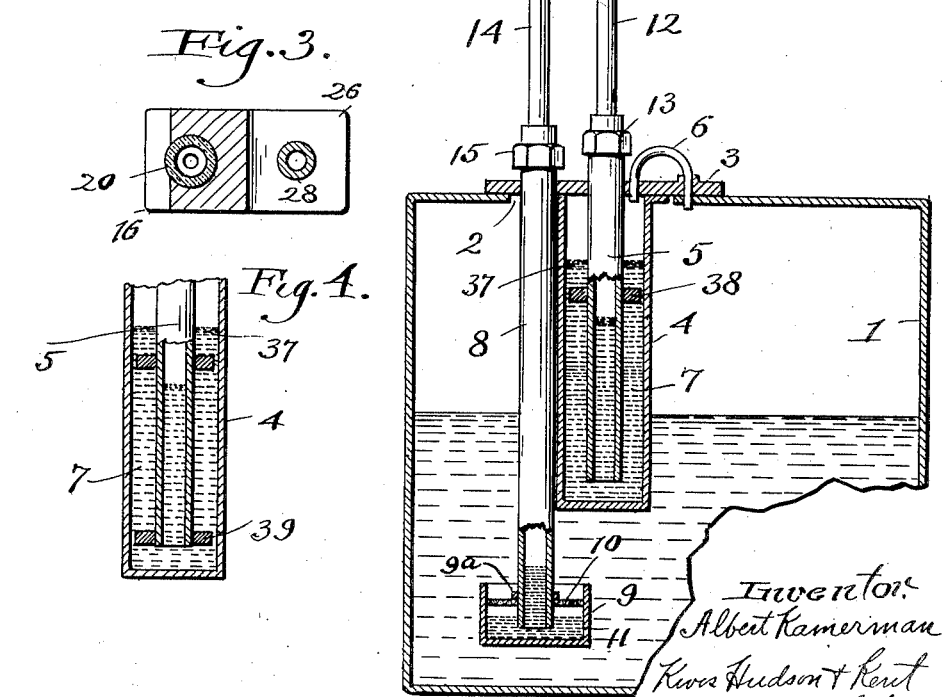

Patented Jan. 10, 1928.

1,656,069

UNITED STATES PATENT OFFICE.

ALBERT KAMERMAN, OF CLEVELAND, OHIO.

LIQUID-LEVEL-INDICATING DEVICE.

Application filed November 27, 1925. Serial No. 71,693.

This invention relates to liquid level indicating devices designed to indicate at a distance from a container the quantity of liquid in said container. More particularly the invention relates to an indicating device including the fluid pressure gauge adapted to be mounted on the instrument board of a motor vehicle and connected with a liquid container mounted on any part of the vehicle in such manner as to register the quantity of liquid in the container.

The gauge of the present invention is applied to an indicating device of the type in which a pressure gauge of the U tube type is mounted on the instrument board of a motor vehicle and the opposite legs of the gauge are connected by pipes with the interior of the container adjacent the bottom thereof and with the air above the body of liquid in the container, so that the liquid in the gauge is subjected on one side to the pressure of the liquid at the bottom of the container and on the other to the pressure of the air above the liquid.

It has been found in liquid level indicating devices of this type that there is considerable fluctuation of the visible liquid column in the gauge which makes it difficult to obtain an accurate reading while the vehicle is being driven.

The jolting of the vehicle as it travels along the road causes the liquid to be sloshed around in the container and the passage of the vehicle around curves in the road causes the liquid to be thrown toward one side or the other of the container. These movements of the liquid in the container cause sharp fluctuations in the pressure at the lower end of the pipe extending into the tank, and the varying pressure transmitted through the pipe to the liquid in the gauge causes the visible liquid column to be shifted up and down in accordance with these fluctuations in pressure.

It is the object of the present invention to provide a gauge so constructed that the momentary movement of the body of liquid in the container will not cause fluctuations of the liquid level in the gauge.

With the above and other objects in view, the invention may be said to comprise the device as illustrated in the accompanying drawings hereinafter described and particularly set forth in the appended claims together with such variations and modifications thereof as will be apparent to one skilled in the art to which the invention appertains.

Reference should be had to the accompanying drawings forming part of this specification in which Fig. 1 is a side elevation of the gauging device with portions thereof shown in section; Fig. 2 is a front elevation of the gauge proper; Fig. 3 is a section on line 3—3 of Fig. 1. Fig. 4 is a vertical section showing a modified form of stabilizing device in one of the liquid seal receptacles.

In the accompanying drawings the invention is shown applied to the fuel tank of a motor vehicle, the tank being illustrated more or less diagrammatically and indicated by the numeral 1. The tank 1 is provided with an opening 2 in the top thereof and this opening is closed by a cover plate 3 secured in any suitable manner to the top wall of the tank. A tubular member 4 which has a closed lower end, is attached to the under side of the cover plate 3 and projects down into the tank 1, and axially of the tubular member 4 there is a small pipe 5 also carried by the cover plate 3 which projects through the cover and extends down in the tubular member 4 to a point adjacent the bottom thereof. A short pipe 6 carried by the cover plate 3 communicates at one end with the interior of the tubular member 4 and at its other end with the interior of the tank 1 at the top thereof, establishing communication between the interior of the tank 1 above the level of the liquid and the interior of the tubular member 4 at the top thereof. Within the tubular member 4 there is a body of liquid 7 which is preferably non-volatile and which fills the lower end of the tubular member 4 to a point above the lower end of the pipe 5, the body of liquid 7 forming liquid seal for the open end of the pipe 5, the liquid within the pipe 5 being subjected to the pressure of the air in the upper part of the tubular member 4 which is the same as that of the air above the level of the liquid in the container. Alongside the tubular member 4 there is a second small pipe 8 which projects through the cover 3 and extends downwardly in the tank 1 to a point adjacent the bottom thereof. A shallow receptacle 9 is secured upon the lower end of the pipe 8 by any suitable means such as a spider 9ª, the open top of the receptacle 9 being somewhat above the lower end of the pipe 8. The top of the receptacle 9 around the pipe 8 is covered by an annular piece of wire screen 10 and the receptacle 9 contains a body of liquid 11 which is preferably non-volatile and non-mixable with the liquid within the tank. The body of liquid 11 forms a liquid seal at the lower end of the pipe 8, the liquid within the pipe 8 being subjected to the pressure of the air within the pipe, and the liquid in the receptacle surrounding the pipe being subjected to the pressure of the liquid at the bottom of the tank. The pipe 5 is connected at its upper end to a pipe 12 formed of copper tubing of small diameter by means of a coupling 13, and the pipe 8 is connected at its upper end to a pipe 14 also formed of small copper tubing by means of a coupling 15. The pipes 12 and 14 extend side by side from the tank to the instrument board of a vehicle where they are connected to the opposite legs of a gauge of the U tube type, the connection herein shown being designated by the numeral 16.

The gauge 16 which may be in the form of a casting is provided with a long recess 17 in the upper portion thereof and has formed therein a threaded opening 18 leading from the upper end of the gauge into recess 17. Within the threaded opening 18 there is a short threaded plug 19 which is screwed down into the lower end portion of the opening and engages the upper end of a glass tube 20, the lower end of which engages in a depressed seat 21 at the lower end of the recess 17, the glass tube being clamped between the screw plug 19 and the seat 21. A second screw plug 22 closes the upper end of the opening 18 with an opening leading from the back thereof to the opening 18 in the space between the plugs 19 and 22, and into this lateral opening there is screwed a nipple 23 which is conected by means of a coupling 24 to the pipe 12. The lower plug 19 is provided with a central opening 25 so that the upper portion of the glass tube 20 is in communication with the pipe 12. At its lower end the gauge has a rearwardly offset portion 26 which is formed hollow to provide a chamber 27 upon the interior thereof. At the top of the offset portion 26 there is an opening 26' leading down into the chamber 27, and screwed to this opening there is a short nipple 28 which is connected by a coupling 29 to the pipe 14 so that the upper part of the chamber 27 is in communication with the pipes 14 and 8 extending to the bottom of the tank 1. A lateral passage 30 extends forwardly from the chamber 27 beneath the lower end of the glass tube 20 and is connected with the interior of the tube 20 by a sort vertical branch passage 31 which opens into the tube 20. The passage 30 is extended somewhat beyond the branch passage 31 to provide a pocket or dead end 32 at the bend between the passages 30 and 31. Within the chamber 27 there is a short bent tube 33 which has one branch extending into the passage 30 and its other branch extending down at right angles to the first to a point adjacent the lower end of the chamber 27, the lower end of the tube 33 being positioned in a concave depression 34 at the lower end of the chamber 27. A body of liquid 35 is contained within the chamber 27 and is adapted to pass through the tube 33 and passages 30 and 31 into the transparent tube 20. The liquid 35 is preferably a non-volatile liquid suitably colored, so that it will be readily visible in the transparent tube 20. Since the upper end of the glass tube 20 communicates with the pipe 12, the liquid 35 within the chamber 27 will be subjected to the pressure of the liquid at the lower portion of the tank 1 while the liquid within the tube 20 will be subjected to the pressure of the air in the tank 1 above the liquid, these pressures being transmitted through the liquid seals at the ends of the pipes 5 and 8 and through the bodies of air trapped between the liquid 35 of the gauge and the liquids 7 and 11 sealing the lower ends of the pipes 5 and 8. The pressure exerted upon the liquid 35 in the chamber 27 in proportional to the height of the liquid within the tank 1 and the amount of liquid forced from the chamber 27 into the tube 20 will vary as the pressure within the chamber 27 varies. A suitable graduated scale 36 is provided on the body of the gauge along the side of the tube 20 so that the level of the liquid in the tube 20 will indicate the quantity within the tank 1.

The tube 33 in passages 30 and 31 is of a diameter relatively small with respect to that of the chamber 27, and forms a small tortuous passageway from the lower end of the tube 20. This small tortuous passageway slows down the rate of the flow of liquid from the chamber 27 to the tube 20 so that when a certain pressure is exerted on the liquid 35 in the chamber 27 the liquid will be slowly forced upwardly into the tube 20 until the pressure in the tubes 12 and 14 is balanced. Momentary fluctuations of pressure, however, will not cause noticeable fluctuation of the level of the liquid in the tube 20 since it is necessary that the pressure be continued for an appreciable period of time to force sufficient liquid into the tube 20 to perceptably change the level thereof in the tube. The dead end or pocket 32 at the bend between the passages 30 and 31 also tends to create a reversal of flow across the outlet passage 31, thus impeding flow of liquid and preventing fluctuations in the level of the liquid in the tube 20. While there is no marked movement of the liquid within the tank 1 there will be a steady pressure in the upper portion of the chamber 27 and the liquid in the tube 20 will be held at a level to correctly indicate the amount of liquid in the tank 1, and the liquid will be maintained at this level regardless of momentary fluctuations in the pressure due to movement of the liquid in the tank while the vehicle is in motion.

When the gauging device is assembled, the sealing liquids 7 and 11 are placed in the receptacles 4 and 9 trapping a body of air in each of the pipes 12 and 14. The receptacle 4 is preferably filled with liquid to a height sufficient to create pressure in both pipes appreciably in excess of atmospheric, the pressure being such that within the limits of atmospheric temperature to which the pipes will be subjected in use there will always be a positive pressure in the pipes even when the container 1 is empty. It has been found that by maintaining a positive pressure in the pipes the range of temperature through which accurate readings are obtained from the gauge is increased.

Various liquids may be used in the sealing containers and in the gauge. A mixture of four parts glycerine to one of water has been found quite satisfactory for the seals. The same liquid may be used in the gauge, but I prefer to use a mixture of mineral oils such as obtained by mixing kerosene with a mineral oil such as used for medicinal purposes.

Since the liquid in the receptacle 4 is exposed to the air, I preferably cover this with a thin layer of liquid which will not readily take up moisture from the air. A thin layer 37 of mineral oil such as used for medicinal purposes has been found to give good results.

As an additional means of preventing fluctuations of pressure in the pipe lines, I provide means within the receptacle 4 and outside of the pipe 5 for retarding the flow of the sealing liquid. The retarding means is in the form of a stabilizing disk 38 which is fixed to the pipe 5 at substantially the level of the liquid outside the pipe 5 when the container 1 is empty. The stabilizing disk 38 is of material thickness and of a diameter but slightly less than the internal diameter of the receptacle 4 so that there is a very narrow annular passage for the liquid between the periphery of the disk 38 and the wall of the receptacle. It will be obvious that momentary fluctuations in the air pressure within the upper portion of the container 1 cannot readily be communicated through the liquid in the receptacle 4 to the gas within the pipe 12.

It has also been found that the stabilizing disk 38 serves another useful purpose in that it retards the lowering of liquid within the glass tube 20 which occurs at temperatures below freezing, and increases the range in temperature through which accurate readings can be obtained on the gauge.

Where excessively long pipe lines 12 and 14 are employed, it has been found advantageous to provide a second stabilizing disk in the receptacle 4 and this modification is illustrated in Fig. 4 in which a second stabilizing disk similar to the disk 38 is secured to the pipe 5 adjacent the lower end thereof.

Having described my invention what I claim is:

1. In a device of the character described, the combination with a container for liquid, of a U-tube gauge containing a body of liquid and having two end portions with the body of liquid interposed between said end portions, a pipe connecting one end portion of the gauge with the interior of the container adjacent the bottom thereof, a second pipe connecting the opposite end of the gauge with the atmosphere above the level of the liquid in the container, means within the container forming a liquid seal between the ends of the pipes and the liquid and air in the container, there being a body of gas between the body of liquid in the gauge and each of the liquid seals at the ends of the pipes, means for impeding the flow of liquid in the gauge, and means for impeding the flow of liquid sealing the end of the second pipe.

2. In a device for indicating the quantity of liquid in a container the combination with the container for liquid, of a U-tube gauge containing a mobile body of liquid and having a transparent portion, a pipe connecting the gauge with the interior of the container at the bottom thereof, a liquid retaining receptacle into which the end of the pipe within the container extends, said receptacle having a body of liquid therein which is non-volatile and non-mixable with the liquid of the container and which forms a liquid seal at the end of said pipe, there being a body of gas between the said bodies of liquid, a second pipe connecting the gauge with the container, and an upright elongated tubular receptacle into which the end of said second pipe extends, said receptacle having a body of non-volatile liquid therein which covers and seals the open end of said second pipe, the upper end of said receptacle being in communication with the interior of the container above the level of the liquid therein, there being a body of gas confined between the liquid of the elongated receptacle and the liquid in the gauge, the pressure of the gas in both pipes being above atmospheric and the pressure of the gas in the second pipe being higher than the pressure in the first when said container is empty.

3. In a device for indicating the quantity of liquid in a container, a pressure indicating gauge of the U tube type, a pipe connecting each leg of the gauge with the container, one of said pipes communicating with the interior of the container adjacent the bottom and the other with the interior of the container above the level of the liquid therein, an upright elongated tubular receptacle into which said last mentioned pipe extends, said receptacle having a body of liquid therein covering the open end of the pipe, and a stabilizing disk surrounding said pipe within said receptacle and providing a narrow passageway for liquid between the periphery thereof and the wall of the receptacle.

4. In a device for indicating the quantity of liquid in a container, a pressure indicating gauge of the U tube type, a pipe connecting each leg of the gauge with the container, one of said pipes communicating with the interior of the container adjacent the bottom and the other with the interior of the container above the level of the liquid therein, an upright elongated tubular receptacle into which said last mentioned pipe extends, said receptacle having a body of liquid therein covering the open end of the pipe, and means between the exterior of said pipe and the wall of said receptacle for impeding the flow of liquid.

5. In a device for indicating the quantity of liquid in a container, a pressure indicating gauge of the U tube type, a pipe connecting each leg of the gauge with the container, one of said pipes communicating with the interior of the container adjacent the bottom and the other with the interior of the container above the level of the liquid therein, an upright elongated tubular receptacle into which said last mentioned pipe extends, said receptacle having a body of liquid therein covering the open end of the pipe, and a pair of spaced stabilizing disks surrounding said pipe within said receptacle and providing narrow passageways between the peripheries thereof and the wall of the receptacle, one of said disks being adjacent the lower end of the pipe and the other of the disks being adjacent the surface of the liquid when the container is empty.

In testimony whereof, I hereunto affix my signature.

ALBERT KAMERMAN.